United States Patent Office 2,952,271
Patented Sept. 13, 1960

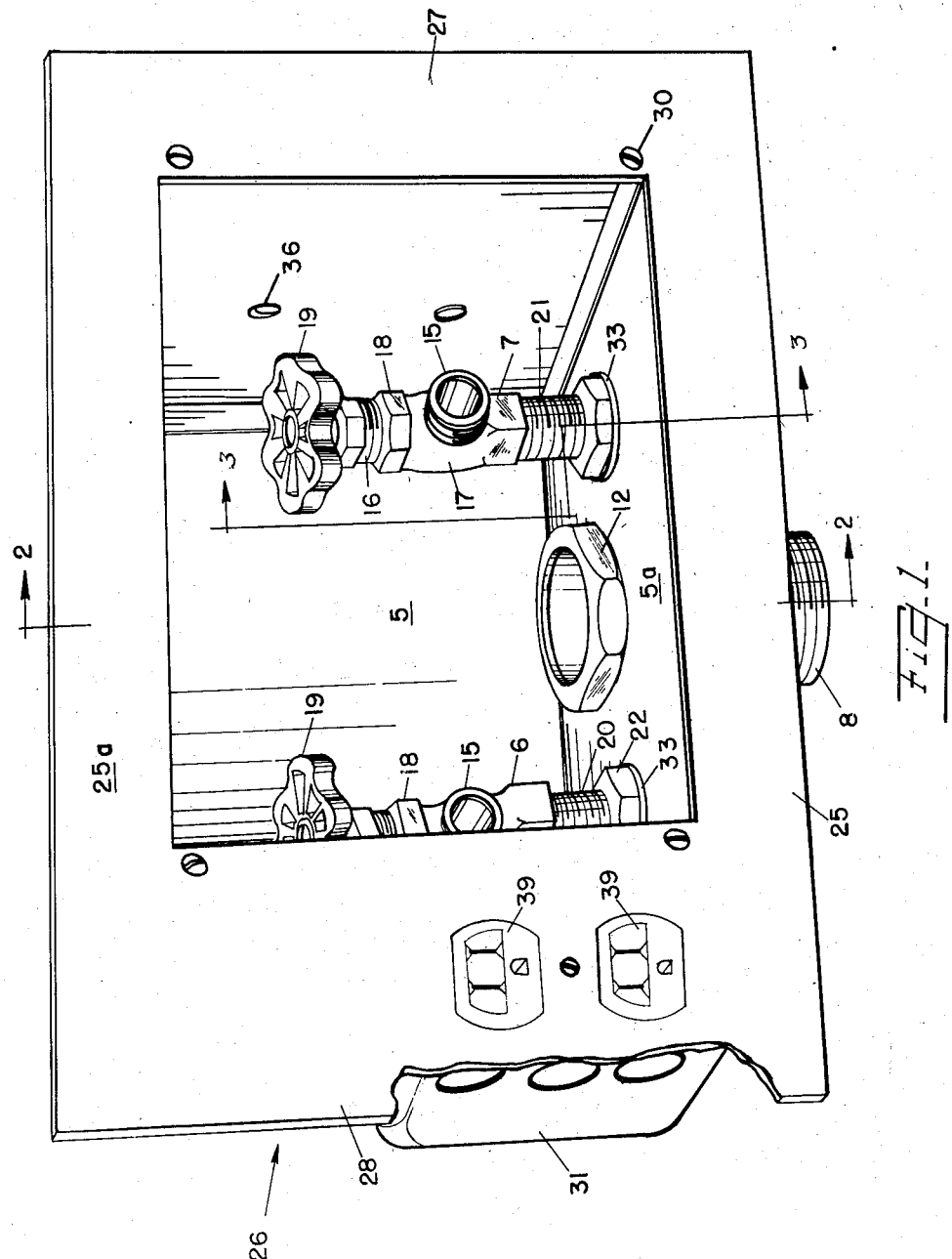

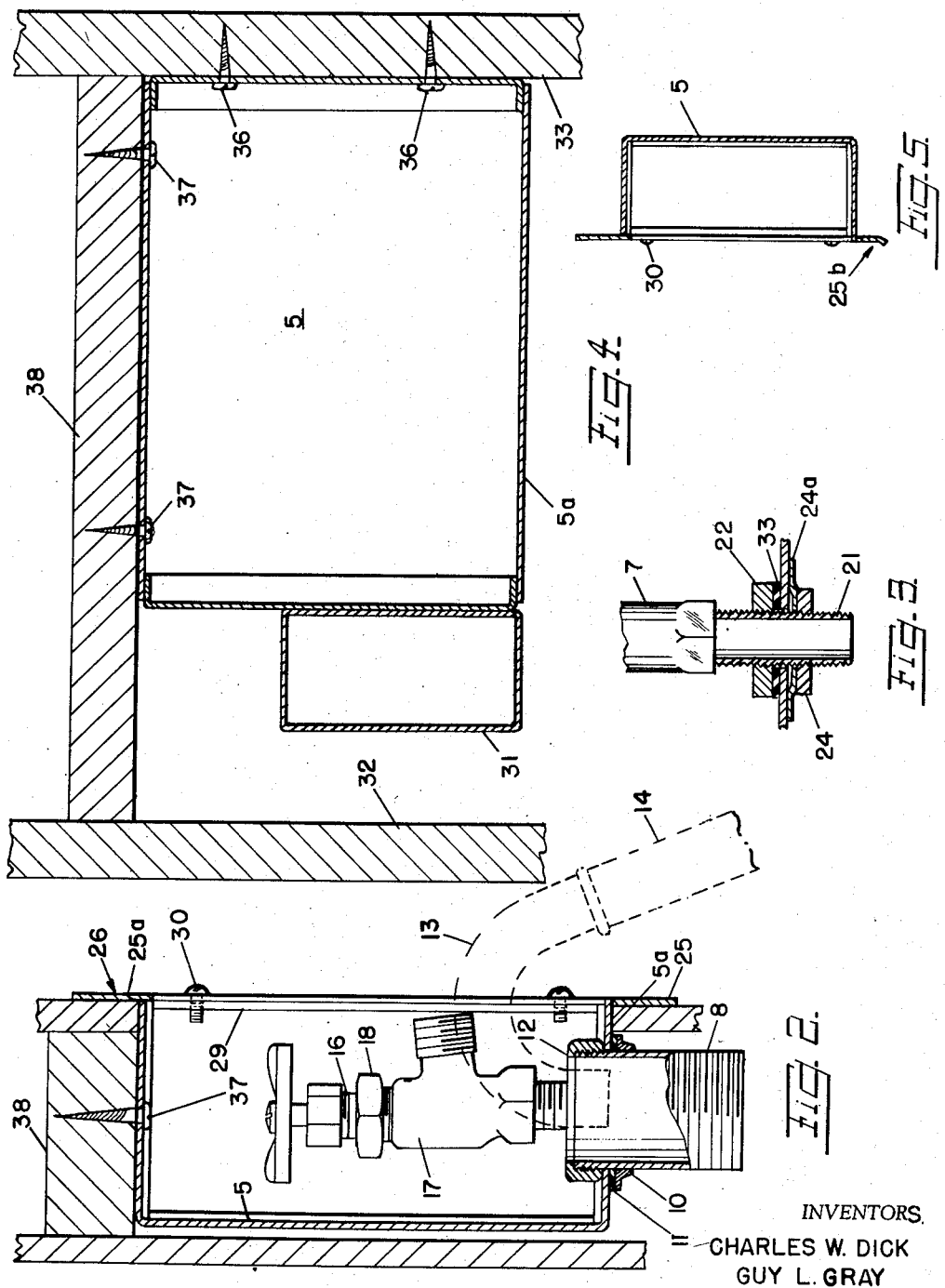

2,952,271
WASHING MACHINE SUPPLY AND DRAIN ASSEMBLIES

Charles W. Dick, Paducah, Ky., and Guy L. Gray, Rte. 1, Paducah, Ky.; said Charles W. Dick assignor to said Guy L. Gray Filed Dec. 15, 1958, Ser. No. 780,295

3 Claims. (Cl. 137—360)

This application is a continuation-in-part of application Serial No. 732,565, filed May 2, 1958, now abandoned. The invention relates to an assembly for effecting the ready installation of the hot and cold water supply lines and the drain connections of washing machines.

The primary purpose of the invention is to provide an assembly of parts adapted to be almost completely concealed within a wall recess and wherein the water supply and drain connections and faucets will lie wholly inside the line of the face of the wall, so that the said connections and faucets will not hold the washing machine away from the wall.

An important object of the invention is to provide an assembly comprising a box dimensioned to be recessed within a wall, which box houses the water supply and drain connections and wherein the structure is of such nature that the box can be readily wiped out and kept clean by the housewife and is also of such nature that any accidental drip or leakage of water from either of the supply faucets will be prevented from accumulating in the box and also prevented from finding its way down inside the plaster of the wall.

A further object of the invention is to provide a box containing the water supply and drain connections and faucets as described, together with a vertical face or wall plate, having an opening therein of substantially the area of the front of the box, whereby free access to the water supply faucets and drain connections may be had, said recessed box having an electrical outlet box attached thereto and the said wall plate comprising a portion which overlaps the electrical outlet box and which overlapping portion has an opening or openings therethrough, through which the conventional plug-in connections of the electrical outlet box project. This described arrangement results in providing means whereby the act of installing the recessed faucet carrying box automatically installs the electrical outlet box, rendering unnecessary the installation of supports upon which the electrical outlet box may be mounted. Further, it causes the wall plate to serve the double function of a cover plate to cover the rough edges of the plaster which are left when the plasterer brings the finished plaster wall flush with the outer edges of the box proper and also a cover plate for the electrical outlet box, through an opening of which the plug-in outlet of the outlet box is left accessible for the plugging in of the electrical supply line of the washing machine.

The manner in which these desirable objects are attained will be best understood by reference to the accompanying drawings wherein:

Fig. 1 is a perspective view of an assembly constructed in accordance with the invention;

Fig. 2 is a central vertical section through the drain, hereinafter described;

Fig. 3 is a vertical, sectional view on the line of one of the faucets with the faucet in elevation;

Fig. 4 is a vertical, longitudinal sectional view showing the box or receptacle, and the electric outlet box only; and Fig. 5 is a fragmentary vertical section through the box or receptacle and its cover plate, illustrating an out-turned lower edge upon the cover plate.

Like numerals designate corresponding parts in all of the figures of the drawings.

The present invention contemplates the provision of a box-like receptacle 5 adapted to be mounted in a recessed position in a building wall and housing a pair of hot and cold water faucets 6 and 7 and an open top drain nipple 8. Nipple 8 passes through the bottom of box 5 and is bound fixedly to said box between a nut 10 and rubber or like packing washer 11 located beneath the box, and a ring-like ferrule 12 that is threaded upon the upper end of the nipple 8, above the bottom of the box. The nipple constitutes the connection for a conventional drain pipe section (not shown) that leads to a sewer. The open top drain is of a size to receive and retain the goose-neck terminal end 13 of the discharge or drain hose 14, which leads from a conventional washing machine. Hot and cold water is supplied to said washing machine from the faucets 6 and 7 through short hose sections (not shown), female connections of which hose sections may be screwed upon threaded outlets 15 of the faucets. The faucets are of a well known and conventional type comprising upper body portions 16 which are attached to lower body portions 17 by nuts 18. Operating handles or hand wheels 19 constitute the control elements of the faucets. The lower portions of the faucets carry the outlets 15 and are threaded upon the upper ends of water supply nipples 20 and 21. These nipples pass vertically through the bottom of the box and are bound in place between nuts 22 and packing washers 23 located above said bottom and nuts 24 threaded upon said nipples below said box bottom and lock washers 24$^a$ upon which said nuts bear. The upper face of the bottom 5$^a$ of box 5 lies slightly above the level of the upper edge of the lower panel 25 of the wall plate or cover 26. This wall plate comprises upper panel 25$^a$, lower panel 25, right side panel 27, and left side panel 28. The forward edge portion of the box bottom, 5$^a$ overlies the upper edge of the lower panel 25 in such manner that if, by reason of leakage at the hose connections, water should be discharged upon bottom 5$^a$ such water will not collect, but will pass over the front edge of the box bottom and to a point wholly outside the outer face of panel 25. Thus any water of leakage is prevented from finding its way down inside the building wall where it might damage plaster or other portions of the wall. The described panels constitute a rectangular annulus which surrounds the open front face of box 5 and defines an opening through which the operator may have access to the faucets for the purpose of attaching the washing machine hoses to the outlets 15 and for manipulating the hand wheels 19. The open cover plate 26 is secured to the flanges 29 of box 5 by screws 30. These flanges are parts of the ends of the box, which ends are of shallow pan-like formation. In Fig. 2 the lower panel 25 presents a straight line from top to bottom while in Fig. 5 the lower edge of the panel 25$^b$ is shown slightly out-turned to prevent any trickles of water which may find their way to said lower edge from travelling by capillarity back to and running down the outer face of the wall. Any drip will fall to the floor where it may readily be observed and wiped up. This is much to be preferred to having water travel down inside of the wall or inside of panel 26.

By making the bottom 5$^a$ overlie the panel 25 as described the housewife may keep the structure neat and clean by merely wiping it out occasionally and all danger of damage to the wall is prevented.

The box 5 has an electric outlet box 31 welded or otherwise secured thereto. For purposes of explanation we have shown how our device may be mounted between adjacent and standard studs 32 and 33 of a frame building. The right hand end of the box is provided with openings through which screws 36 may pass to secure the right end of the box to stud 33 while the top of the box is provided with openings through which screws 37 may pass to suspend the box from a horizontal header 38 which header extends between and is secured to the studs 32 and 33. Thus, it will be noted that the box is supported from its top and one end only. The other end of the box is not supported but is left free for the reception of the electric outlet box. In standard frame building constructions the studs are usually placed 16 inches apart. It is not necessary for us to make our receptacle long enough to span the distance between studs because the suspension of the box from the header and the engagement of one end of the box with a stud gives all necessary security of mounting and thus leaves room for the electric outlet box. Thus the act of mounting the receptacle 5 in a recessed portion of a wall also provides the necessary mounting for the electric outlet box. This box carries the usual plug-in outlets, the plug-in ends of which are indicated at 39 and one of which may supply current to operate the washing machine that is being serviced by the faucets and drain above described. By recessing the box 5 in the wall and by passing the drain and water supply connections through the bottom of the box all portions of the faucets are housed within the box. With the hoses removed the washing machine may be pushed against the wall. Thus recreation rooms when used to receive a washing machine may be kept free of the unsightly protruding faucets, which have sometimes been used in installations having recessed drains for receiving the gooseneck terminal of the drain hoses of washing machines. It is a primary object of the invention to provide a device of the character described comprising such a correlation of the necessary parts, to wit, a recessed box, the hot and cold water faucets and an open top drain pipe, that the point of location of all of these elements within a wall may be reached by the plumber with a minimum amount of work and without requiring the plumber to cut through any of the supporting elements of the box, in order to connect hot and cold water service pipes to hose receiving faucets, housed and lying wholly within the confines of the box. To this end we employ the described assembly in which the axes of both of the water supply pipes, the axis of the drain pipe outlet and the axes of the faucet operating handles, all lie in parallelism. Thus, the water supply pipes and the drain pipe may all lie side-by-side in the space within the wall and beneath the box. The axis of the casings of the faucets also lie in parallelism with the water supply pipes, as shown. The fittings 20 and 21 constitute mountings for the faucets and this assembly renders the faucets themselves the terminal end members of the water lines. As a result there is no necessity for any part of the water supply lines to extend above the box and consequently it is not necessary for the plumber to cut through any supporting element of the box such as the header 38 or either of the studs 32 and 33. The faucets are of a conventional type in which the operating hand wheels with their stems are removable, while leaving the lower portions of the faucets undisturbed. The described arrangement results in disposing all parts of the faucet structures wholly within the confines of the box, with no part thereof projecting outwardly beyond the plane of the front face of the wall plate.

Further, in installing our device in existing and completed buildings it is not necessary to remove any part of the wall above the box receiving recess, since all of the drain and the water supply pipes lie below the box. It is to be noted that the top of the drain pipe 8 extends only slightly above the floor of box 5. Thus, the large open mouth of the drain pipe is disposed at a very low point in the box. The hand wheels 19, on the other hand, are disposed at the top of the upstanding vertical faucets and thus lie well above the open mouth of the drain pipe. Therefore, a relatively wide and high space is left above the open top of the drain pipe and this facilitates the entry of and the ready hooking of the goose neck 13 into the top of the drain pipe. This relatively large space above the drain pipe also gives room for the user to introduce his or her hands into the box for the purpose of manipulating said hand wheels in turning the hot and cold water supply on and off. The increasing popularity of the ranch-type house in which utility rooms, recreation rooms, laundry rooms, etc. all are located upon the same level, is rendering the use of rooms in such houses as double duty rooms, increasingly prevalent and it is very desirable that when the laundry space and the recreation room are combined, that the utilitarian aspects of the whole be minimized as much as possible. The concealment of the faucets in a recess within a wall and the possibility of pushing the washing machine very close to the wall aid in accomplishing this object.

While we have described the assembly as being mounted between the studs of a frame building the device may be mounted in any type of wall, such as brick, concrete, block or otherwise. It is only necessary to form a recess in the wall and to locate therein supporting means adapted to receive the screws which pass through the openings in the top and one end of the box.

It is to be understood that the invention is not limited to the precise construction shown but that it includes within its purview whatever changes come within either the terms or the spirit of the appended claims.

What we claim is:

1. A structure comprising a box-like receptacle dimensioned to be housed within a recess in a building wall and carrying water supply faucets and an open top drain outlet fitting, all located wholly inside of said receptacle, a front cover plate in the form of a rectangular annulus, comprising top, bottom and two side panels, means for securing the said cover plate to the receptacle in position to have the top and two sides of the receptacle lie rearwardly of and in covered position behind the top and two side panels of the cover plate, the bottom of the receptacle lying at a level above the top edge of the lower panel of the cover plate and having its forward edge portion projecting outwardly of its sides and top to a degree that said forward edge portion of the bottom of the receptacle overlies the top edge of the lower panel of the cover plate, whereby water of leakage from inside the receptacle will be discharged outwardly of and over said lower panel.

2. A supply assembly for washing machines comprising an open-front box dimensioned to be recessed in a building wall, hot and cold water supply connections and a drain connection, all disposed in parallelism and upon vertical axes and entering said box through the bottom thereof, the said drain connection lying between the hot and cold water supply connections and having an open top mouth, said hot and cold water supply connections including upstanding faucets having threaded, hose receiving side outlets which face substantially toward the open front face of the box, an open front vertical wall plate secured to said box comprising top and bottom and side panels which surround the open front of the box, an electric outlet box secured to and carried by the first named box which outlet box faces toward the rear face of one of the panels of the wall plate and carries a conventional plug-in socket, said panel having an opening therethrough conforming in size and shape to said plug-in socket and through which said plug-in socket of the electrical outlet box projects.

3. A supply assembly for washing machines comprising an open-front box dimensioned to be recessed in a building wall, hot and cold water supply connections and a drain connection, all disposed in parallelism and upon vertical axes and entering said box through the bottom thereof, the said drain connection lying between the hot and cold water supply connections and having an open top mouth, said hot and cold water supply connections including upstanding faucets having threaded, hose receiving side outlets which face substantially toward the open-front face of the box, an open-front vertical wall plate secured to said box comprising top and bottom and side panels which surround the open front of the box, an electric outlet box secured to and carried by the first named box which outlet box faces toward the rear face of one of the panels of the wall plate and carries a conventional plug-in socket, said panel having an opening therethrough conforming in size and shape to said plug-in socket and through which said plug-in socket of the electrical outlet box projects, the top and side panels of the said wall plate lying outwardly of and covering the top and side edges of the box and the bottom of the box lying above the level of the top edge of the lower panel of the wall plate and projecting outwardly over the top edge of said lower panel.

References Cited in the file of this patent

UNITED STATES PATENTS

| | | |
|---|---|---|
| 1,317,829 | Shroyer | Oct. 7, 1919 |
| 1,602,556 | Shroyer | Oct. 12, 1926 |
| 1,648,386 | Grover | Nov. 8, 1927 |
| 2,832,080 | Herterstein | Apr. 29, 1958 |